US007269752B2

(12) United States Patent
John

(10) Patent No.: US 7,269,752 B2
(45) Date of Patent: Sep. 11, 2007

(54) DYNAMICALLY CONTROLLING POWER CONSUMPTION WITHIN A NETWORK NODE

(75) Inventor: Rajesh John, Santa Clara, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 396 days.

(21) Appl. No.: 10/384,272

(22) Filed: Mar. 7, 2003

(65) Prior Publication Data

US 2003/0226046 A1 Dec. 4, 2003

Related U.S. Application Data

(60) Provisional application No. 60/385,984, filed on Jun. 4, 2002.

(51) Int. Cl.
*G06F 1/00* (2006.01)

(52) U.S. Cl. .............. 713/324; 713/300; 713/310; 713/320; 713/321; 713/322; 713/323; 713/324; 709/201; 709/223; 709/225

(58) Field of Classification Search ........ 713/300–340; 709/201, 223, 225
See application file for complete search history.

(56) References Cited

U.S. PATENT DOCUMENTS

| | | | | |
|---|---|---|---|---|
| 5,459,864 A | * | 10/1995 | Brent et al. | 718/105 |
| 5,504,894 A | * | 4/1996 | Ferguson et al. | 707/2 |
| 5,761,507 A | * | 6/1998 | Govett | 718/101 |
| 5,974,457 A | * | 10/1999 | Waclawsky et al. | 709/224 |
| 5,974,462 A | * | 10/1999 | Aman et al. | 709/225 |
| 5,978,864 A | * | 11/1999 | Hetherington et al. | 710/18 |
| 5,996,083 A | * | 11/1999 | Gupta et al. | 713/322 |
| 6,219,723 B1 | * | 4/2001 | Hetherington et al. | 710/18 |
| 6,542,920 B1 | * | 4/2003 | Belkin et al. | 718/104 |
| 6,625,654 B1 | * | 9/2003 | Wolrich et al. | 709/230 |
| 6,859,882 B2 | * | 2/2005 | Fung | 713/300 |
| 6,879,560 B1 | * | 4/2005 | Cahn | 370/230.1 |
| 6,880,156 B1 | * | 4/2005 | Landherr et al. | 718/105 |
| 6,912,637 B1 | * | 6/2005 | Herbst | 711/167 |
| 6,950,669 B2 | * | 9/2005 | Simonsson | 455/522 |
| 2002/0136217 A1 | * | 9/2002 | Christensen | 370/393 |
| 2002/0165973 A1 | * | 11/2002 | Ben-Yehezkel et al. | 709/230 |
| 2002/0174252 A1 | * | 11/2002 | Hayter et al. | 709/250 |
| 2003/0126297 A1 | * | 7/2003 | Olarig et al. | 709/250 |
| 2003/0188208 A1 | * | 10/2003 | Fung | 713/320 |
| 2003/0219033 A1 | * | 11/2003 | Silvester | 370/469 |
| 2004/0114516 A1 | * | 6/2004 | Iwata et al. | 370/230.1 |

* cited by examiner

*Primary Examiner*—Rehana Perveen
*Assistant Examiner*—James F. Sugent

(57) ABSTRACT

A method and system for controlling power consumption within a network node is disclosed. The method and system include dynamically controlling the power consumption of network processing engines based on predetermined thresholds. By dynamically controlling the power consumption of network processing engines based on predetermined thresholds, energy consumption of the overall network processing system is minimized, thereby reducing the operational costs of the system as well as increasing the overall efficiency of network operations. The method and system comprise allowing a queue to receive a plurality of data packets and dynamically controlling the power consumption of at least one of a plurality of processing engines based on a threshold.

1 Claim, 6 Drawing Sheets

DYNAMICALLY CONTROLLING POWER CONSUMPTION WITHIN A NETWORK NODE

CROSS REFERENCE TO RELATED APPLICATIONS

This application is entitled to the benefit of provisional U.S. patent application Ser. No. 60/385,984, filed Jun. 4, 2002.

FIELD OF THE INVENTION

The present invention relates generally to computer networks and more specifically to techniques for controlling power consumption within a network node.

BACKGROUND OF THE INVENTION

Communications networks (LANs, WANs, etc.) currently transfer vast quantities of information in both local and wide area networks. The information typically consists of signals (electronic or optical) representing digitized or digital voice, video, and/or data that is transferred between endpoints in networks. For information to be transmitted in a network, a communication path must be established within the network between the sender(s) and receiver(s) of the information. For example, a communication path may be established by packet switching, wherein virtual circuits or channels are established between sender(s) and receiver(s). The virtual circuits or channels are only occupied for the duration of the transmission of the packet.

In an Internet protocol (IP) environment, the communication channel commonly utilizes the Transmission Control Protocol (TCP) at the transport layer, where the layers of the network are defined by the International Standards Organization (ISO) in the Open System Interconnection (OSI) model. The TCP communication channel is reliable, full-duplex and streaming. To achieve this functionality, the TCP drivers break up a session data stream into discrete packets and attach a TCP header to each packet. An IP header is also attached to the packet and the composite packet is then passed to the network for delivery.

Once the packets are passed to the network, a gateway router routes the data packets to their various destinations. A gateway router is a network node that forwards data packets from one local area network or wide area network to another. Gateway routers read the network address in each transmitted packet and use routing tables and routing protocols to make decisions on where to forward each packet.

FIG. 1 depicts an example of a packet-switching network 100 in which a gateway router 110 connects multiple client computers 101–106. As packets come into the gateway router 110, processing engines within the gateway router 110 process the data packets for delivery to their destination. However, at any given time, processing engines within the gateway router 110 may be idle, i.e. turned on but not processing any data packets. If processing engines are turned on but not processing any data packets, energy is being needlessly consumed by the system thereby wasting system resources and decreasing the overall efficiency of the networking system.

Accordingly, what is needed is a method and system that address the above-outlined shortcomings of the conventional technology. The method and system should be simple, cost effective and capable of being easily adapted to existing technology.

SUMMARY OF THE INVENTION

A method and system for controlling power consumption within a network node involves dynamically controlling the power consumption of network processing engines based on predetermined thresholds. By dynamically controlling the power consumption of network processing engines based on predetermined thresholds, energy consumption of the overall network processing system is reduced, thereby reducing the operational costs of the system as well as increasing the overall efficiency of network operations.

An embodiment of the invention includes a method for controlling power consumption within a network node wherein the network node includes a queue and a plurality of processing engines. The method comprises allowing the queue to receive a plurality of data packets and dynamically controlling the power consumption of the plurality of processing engines based on a threshold.

In an embodiment of the method, the threshold is associated with the queue and dynamically controlling the power consumption of the plurality of processing engines based on the threshold further comprises turning on at least one of the plurality of processing engines once a volume of data packets in the queue reaches the threshold. In another embodiment of the method, the threshold is associated with the plurality of processing engines and dynamically controlling the power consumption of the plurality of processing engines based on the threshold further comprises turning off at least one of the plurality of processing engines based on the threshold.

Another embodiment of the invention includes a system for controlling power consumption within a network node. The system comprises a queue for receiving data packets, power control logic coupled to the queue and a plurality of processing engines coupled to the power control logic wherein the power control logic dynamically controls the power consumption of the plurality of processing engine based on a threshold.

In another embodiment of the system, the threshold is associated with the queue and the power control logic further comprises logic for turning on at least one of the plurality of processing engines once a volume of data packets in the queue reaches the threshold.

Other aspects and advantages of the invention will become apparent from the following detailed description, taken in conjunction with the accompanying drawings, illustrating by way of example the principles of the invention.

DETAILED DESCRIPTION

The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The Internet, which is a global web of interconnected computers and computer networks, integrates local area networks (LANs) located in various entities, such as businesses, libraries, federal agencies, institutes of learning, and research organizations into a single communication network. The Internet uses a common communication protocol suite, known as a Transmission Control Protocol/Internet Protocol (TCP/IP), which was specifically designed for the interconnection of different computer systems. Internal and external networks are linked by routers that route data packets from a sending network to another router or a receiving network. Gateways handle data transfer and conversion of messages from a sending network to the protocols used by a receiving network. Typically, gateways refer to devices that translate between applications. For example, e-mail gateways translate messages from one vendor's messaging program to another vendor's messaging program so that users with different e-mail programs can share messages over a network.

Typically, the computers connected to a wide area network such as the Internet are identified as either servers or clients. A server is a computer that stores files that are available to the other computers connected to the network. For example, an e-mail server manages message traffic and mail boxes for users, in addition to translation facilities or gateways that allow message exchange between different types of e-mail programs. A client is a computer connected to the network that accesses shared resources provided by a server. To obtain information from a server, a client makes a request for a file or information located on the server using a specified protocol. Upon reception of a properly formatted request, the server downloads the file or information to a local message store located at the client.

The present invention includes a method and system for controlling power consumption within a network node such as a switch or a router. The method and system include dynamically controlling the power consumption of network processing engines based on predetermined thresholds. By dynamically controlling the power consumption of network processing engines based on predetermined thresholds, energy consumption of the overall network processing system is minimized, thereby reducing the operational costs of the system as well as increasing the overall efficiency of network operations.

Figure 1:
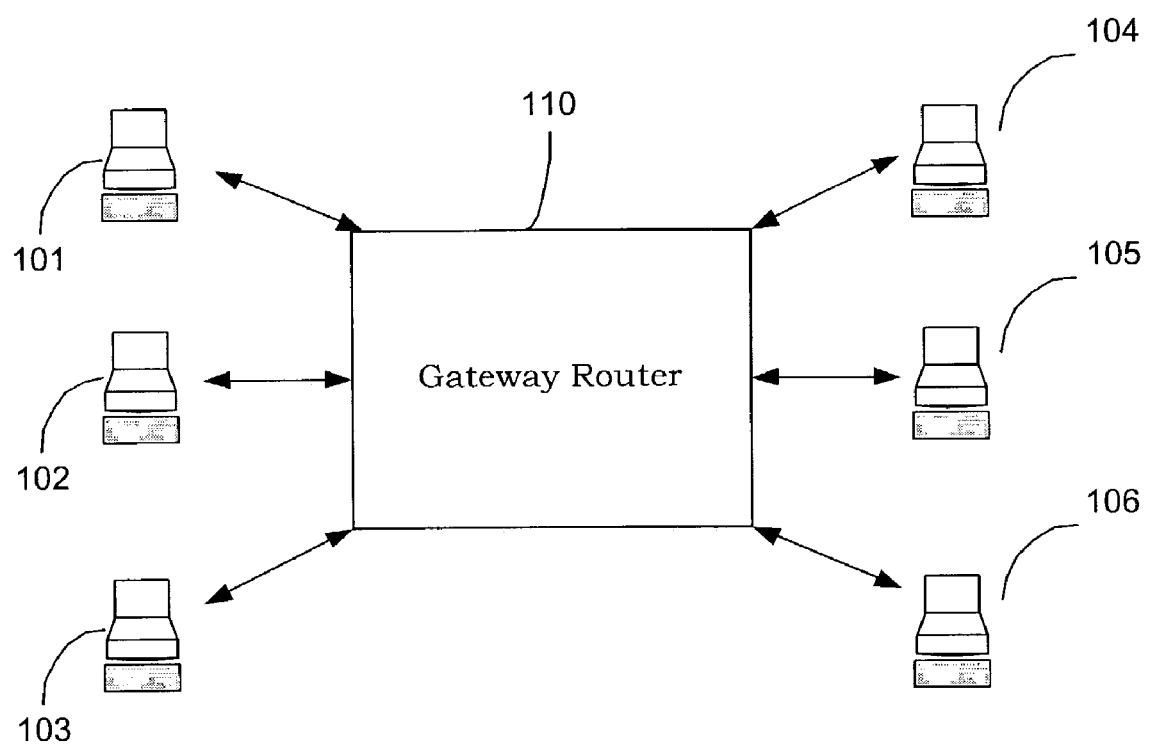
FIG. 1 depicts an example of a packet-switching network.
Figure 2:
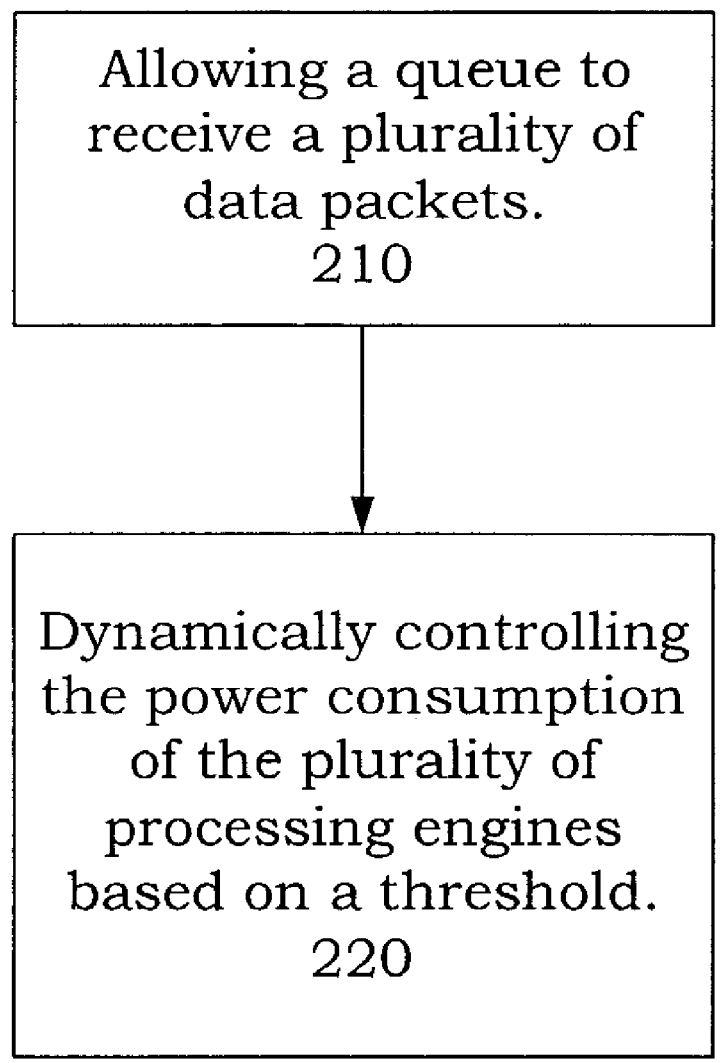
FIG. 2 is a high-level flow chart of a method in accordance with an embodiment of the invention.

FIG. 2 is a flowchart of a method for controlling power consumption within a network node. At block 210 a queue is allowed to receive a plurality of data packets. At block 220, the power consumption of a plurality of processing engines is dynamically controlled based on a threshold.

In this scheme, predetermined thresholds are established for devices within a network node. Based on these established thresholds, network processing engines are turned on and off in a dynamic fashion in order to effectively manage the overall energy consumption of the network node.

Figure 3:
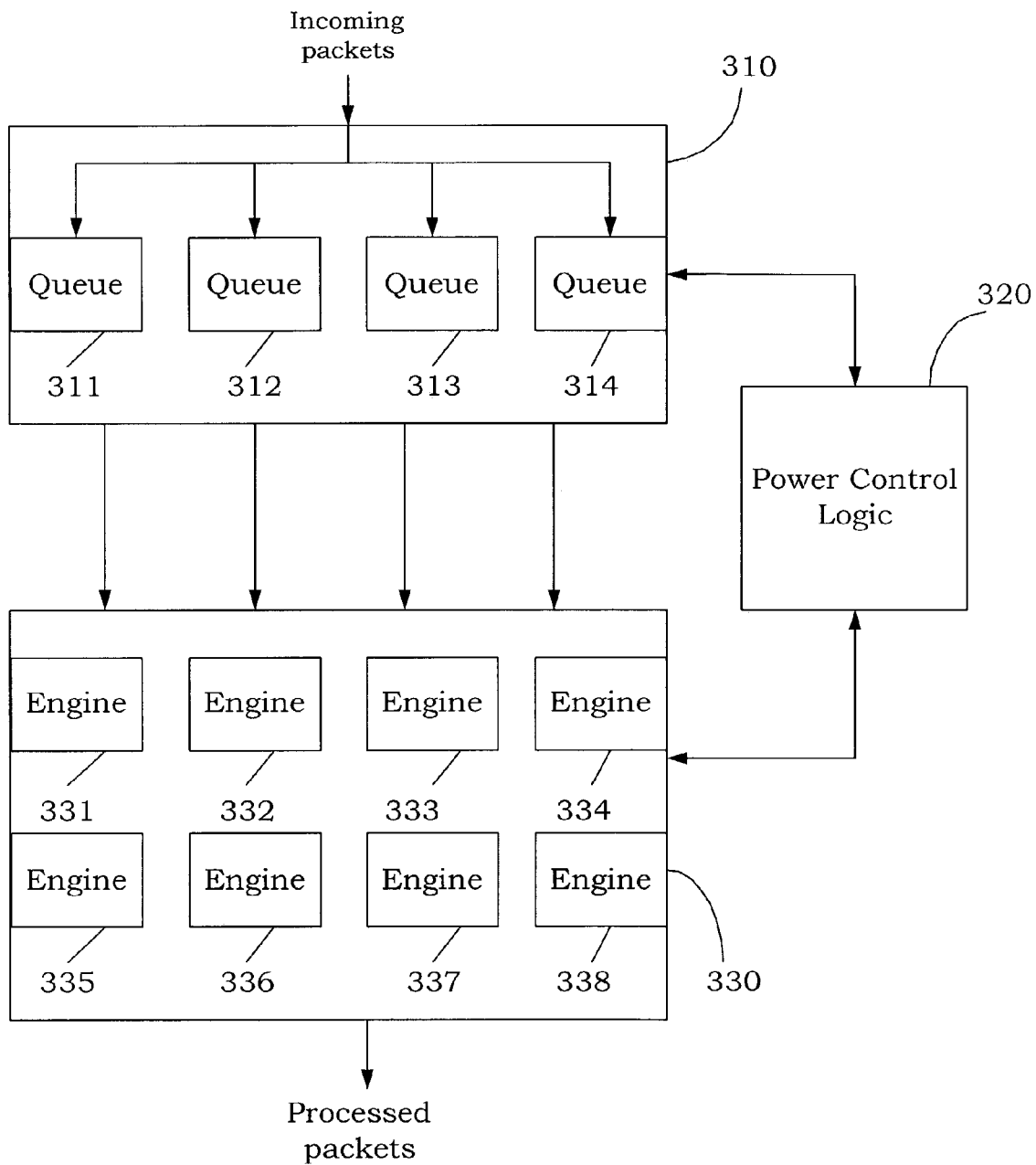
FIG. 3 shows an exemplary system in accordance with an embodiment of the invention.

FIG. 3 shows an exemplary system 300 in accordance with an embodiment of the invention. The system 300 includes a queue system 310, power control logic 320, and a bank of processing engines 330. The queue system 310 is coupled to the bank of processing engines 330 and the power control logic 320 and the power control logic 320 is coupled to the bank of processing engines 330. The queue system 310 includes a plurality of queues 311–314 for receiving data packets and the bank of processing engines 330 includes a plurality of processing engines 331–338 for processing data packets. Each of the queues 311–314 either stores the data packets or contains pointers that indicate the location of the data packets. Based on predetermined thresholds, the power control logic 320 turns on/off one or more of the plurality of processing engines 331–338, thereby dynamically controlling the power consumption of the system 300.

In an embodiment, each of the plurality of queues 311–314 is data-type specific. For example, queue 311 receives a first type of data packet, queue 312 receives a second type of data packet, etc. Although four queues are shown, i.e. four different data types, one of ordinary skill in the art will readily recognize that any number of different types of data could be utilized while remaining within the spirit and scope of the invention.

Figure 4:
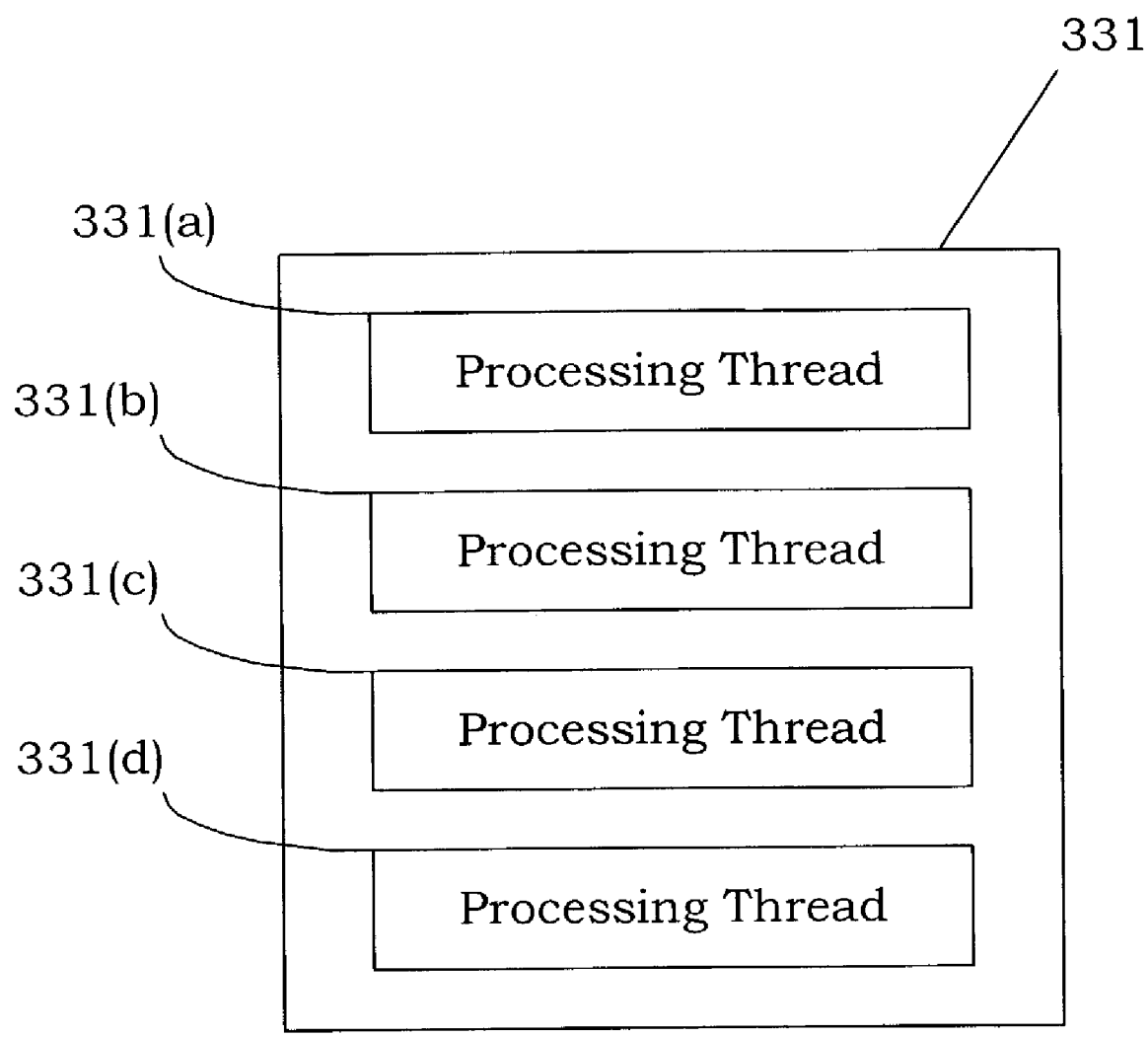
FIG. 4 is a more detailed block diagram of a processing engine in accordance with an embodiment of the invention.

In an embodiment, each of the plurality of processing engines 331–338 is also data-type specific and includes multiple processing threads. In an embodiment, a processing thread represents a series of tasks (i.e., instructions) that are executed by a processing engine for the purpose of processing a single data packet. The processing thread is expected to have gaps between the tasks during which time the processing engine is free to execute tasks related to another packet (i.e., another thread). In an embodiment, each of the plurality of processing engines 331–338 includes 4 processing threads. FIG. 4 shows processing engine 331 including 4 processing threads 331(a–d). Accordingly, four data packets of the same type can be processed in parallel by the four processing threads 331(a–d).

Although the above-described embodiment of the invention is depicted whereby each of the plurality of processing engines includes 4 processing threads, one of ordinary skill in the art will readily recognize that the processing engines could include any number of processing threads while remaining within the spirit and scope of the present invention.

As previously described, based on predetermined thresholds, the power control logic 320 turns on/off one or more of the plurality of processing engines 331–338. These thresholds can be based on the queue system 310 and/or the bank of processing engines 330.

Queue-Associated Threshold

Referring back to FIG. 3, in an embodiment, the power control logic 320 turns on one or more of the plurality of processing engines 331–338 based on a queue-associated threshold. In an embodiment, the queue-associated threshold is based on a volume of data packets received by the queue system 310. For example, the power control logic 320 can be configured to turn on one or more of the plurality of processing engines 331–338 once the volume of data packets received by the queue system 310 reaches a specific percentage of the queue system 310 volume. For instance, the power control logic 320 can be configured to periodically check the volume of the queue system 310 and if volume of data packets received by the queue system 310 exceeds 50% of the entire volume of the queue system 310, the power control logic 320 can be triggered to turn on one or more of the plurality of processing engines 331–338.

One of ordinary skill in the art can readily appreciate that the queue-associated threshold does not have to be associated with the volume of the entire queue system 310. The threshold could be based on a volume of data packets received by one or more of each of the queues 311–314 in the queue system 310 while remaining within the spirit and scope of the present invention.

Additional parameters can be programmed into the system 300 whereby the threshold must be exceeded for a predetermined amount of time before one or more of the plurality of processing engines 331–338 will be turned on. This minimizes the possibility of turning on processing engines in a random or unnecessary fashion.

Figure 5:
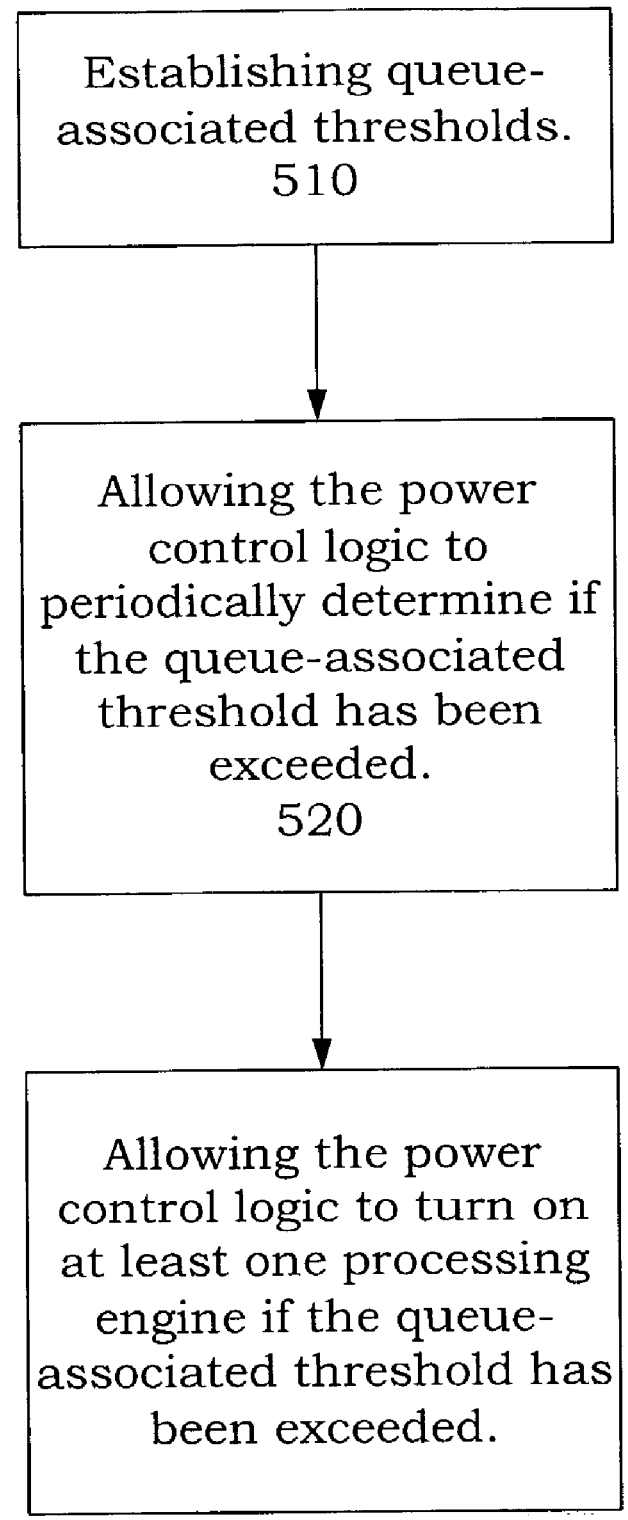
FIG. 5 shows a flow chart of another embodiment of the method in accordance with the invention.

FIG. 5 shows a flow chart of an embodiment of a method for controlling power consumption within a network node in accordance with the invention. At block 510, queue-associated thresholds are established. These thresholds can be based on the volume of data packets received by the entire queue or the volume of data packets received by one or more of each of the data-type specific queues. At block 520, the power control logic is allowed to periodically determine if the queue-associated threshold has been exceeded. Again, in order to minimize the possibility of turning on processing engines in a random or unnecessary fashion, the threshold should be exceeded for a predetermined amount of time. Finally, at block 530, the power control logic is allowed to turn on at least one processing engine if the queue-associated threshold has been exceeded.

Processing Engine-Associated Threshold

Referring back to FIG. 3, in an embodiment, the power control logic 320 is configured to turn off one or more of the plurality of processing engines 331–338 based on a process engine-associated threshold. In an embodiment the process engine-associated threshold is based on a number of processing threads being utilized by the bank of processing engines 330. For example, the power control logic 320 can be configured to turn off one or more of the plurality of processing engines 331–338 once the number of threads being utilized falls below a predetermined amount.

For instance, in an embodiment, each of the processing engines 331–338 includes 4 processing threads thereby equaling 32 total processing threads. At any given time, there may be a number of processing threads that are idle. For the purposes of this patent, a processing thread is "idle" if it is on (and therefore consuming power resources) but not being utilize. The power control logic 320 can be configured to periodically check the number of idle processing threads in the bank of processing engines 330 and if the number of idle processing threads exceeds a predetermined number, the power control logic 320 can be triggered to turn off one or more of the plurality of processing engines 331–338. Turning oft a processing engine means removing all power resources to that engine.

Additionally, once the number of idle processing threads exceeds a predetermined number, the power control logic. 320 can be programmed to turn off one or more of the plurality of processing engines 331–338 based on a priority criteria. In an embodiment, the priority criteria includes 3 different levels of priority. The 3 different levels of priority are as follows: 1) All processing threads are idle, i.e. no active threads (Lowest Priority), 2) Not all threads are idle but the active thread is not processing a large data packet (i.e. a data packet containing 500 Bytes of data or greater), and 3) Not all threads are idle but the active thread is processing a large packet (Highest Priority).

Accordingly, the power control logic 320 can be programmed to turn off processing engines of a lower priority before turning off processing engines of a higher priority. For example, once the number of idle processing threads exceeds a predetermined number, the power control logic 320 will turn off an engine with no active threads before it turns off an engine with active processing threads. Moreover, if all of the engines have active threads, the power control logic 320 will turn off an engine that is not processing a large data packet before it turns off an engine that is processing a large data packet.

Although the above-disclosed embodiment is described based on 3 levels of priority, one of ordinary skill in the art will readily recognize that a variety of different criteria could be utilized to determine which engines get turned off while remaining within the spirit and scope of the present invention.

Figure 6:
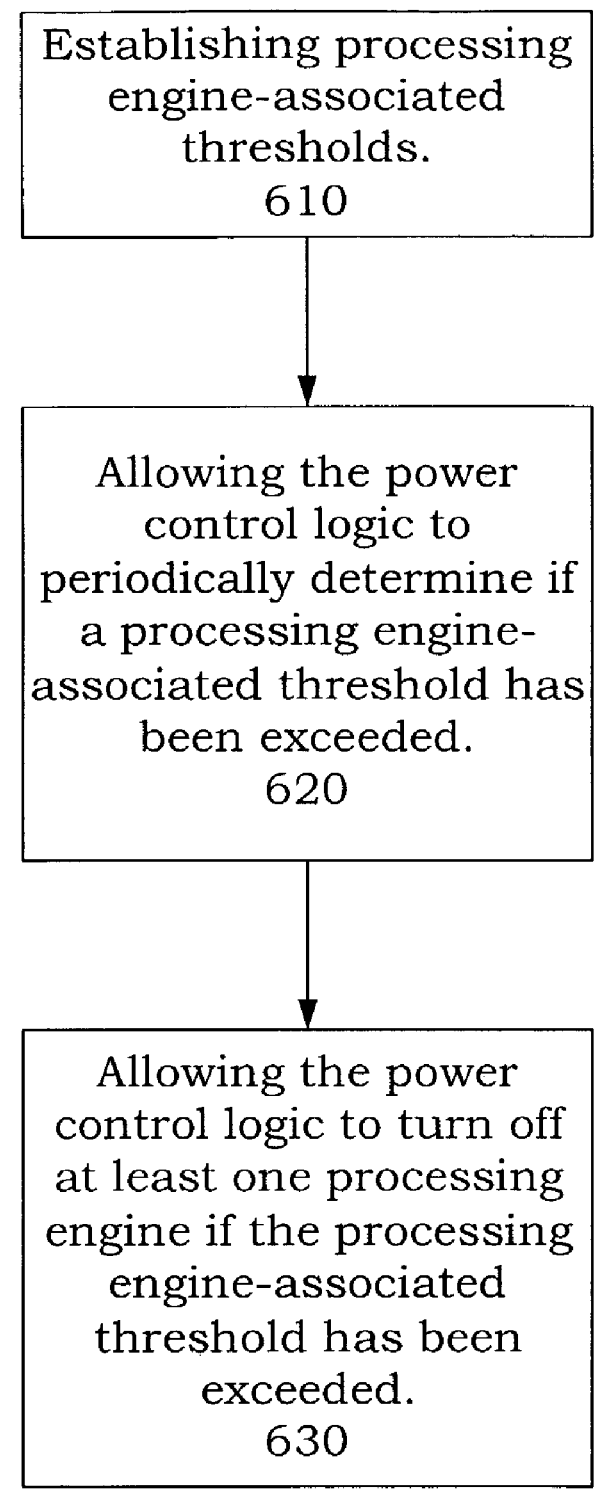
FIG. 6 shows a flow chart of yet another embodiment of the method in accordance with the invention.

FIG. 6 shows a flow chart of another embodiment of a method for controlling power consumption within a network node in accordance with the invention. At block 610, processing engine-associated thresholds are established. In an embodiment the process engine-associated thresholds are based on a number of processing threads being utilized at any given time. At block 620, the power control logic is allowed to periodically determine if the process engine-associated thresholds have been exceeded. Finally, at block 630, the power control logic is allowed to turn off at least one processing engine if the process engine-associated threshold has been exceeded. In an embodiment, the power control logic is programmed to turn off the at least one processing engine based on a priority criteria.

While the invention is described in the general context of a hardware-based implementation that exists in a network packet processor, those skilled in the art will recognize that the invention also may be implemented in software, hardware, or any combination thereof. The above-described embodiments of the invention may also be implemented, for example, by operating a computer system to execute a sequence of machine-readable instructions. The instructions may reside in various types of computer readable media. In this respect, another aspect of the present invention concerns a programmed product, comprising computer readable media tangibly embodying a program of machine readable instructions executable by a digital data processor to perform the method in accordance with an embodiment of the present invention.

This computer readable media may comprise, for example, RAM (not shown) contained within the system. Alternatively, the instructions may be contained in another computer readable media such as a magnetic data storage diskette and directly or indirectly accessed by the computer system. Whether contained in the computer system or elsewhere, the instructions may be stored on a variety of machine readable storage media, such as a DASD storage (e.g. a conventional "hard drive" or a RAID array), magnetic tape, electronic read-only memory, an optical storage device (e.g., CD ROM, WORM, DVD, digital optical tape), paper "punch" cards, or other suitable computer readable media including transmission media such as digital, analog, and wireless communication links. In an illustrative embodiment of the invention, the machine-readable instructions may comprise lines of compiled C, C++, or similar language code commonly used by those skilled in the programming for this type of application arts.

A method and system for controlling power consumption within a network node is disclosed. The method and system include dynamically controlling the power consumption of network processing engines based on predetermined thresholds. By dynamically controlling the power consumption of network processing engines based on predetermined thresholds, energy consumption of the overall network processing system is minimized, thereby reducing the operational costs of the system as well as increasing the overall efficiency of network operations.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for controlling power consumption within a network node the method comprising:
   a) receiving a plurality of data packets in at least one queue of the network node, wherein the network node includes a plurality of processing engines; and
   b) dynamically controlling the power consumption of the plurality of processing engines within the network node, wherein the power consumption is controlled based on a predetermined threshold, wherein each of the plurality of processing engines comprises multiple processing threads, the predetermined threshold is based on the number of idle processing threads of the plurality of processing engines, the network node further includes power control logic coupled to the plurality of processing engines, the power control logic turns off one or more of the plurality of processing engines based on priority criteria, and the priority criteria include:
   a first priority wherein the first priority comprises all of the processing threads being idle,
   a second priority wherein the second priority comprises not all of the processing threads are idle but none of the processing threads are processing a large packet, and
   a third priority wherein the third priority comprises not all of the processing threads are idle but at least one of the processing threads is processing a large packet.

* * * * *